W. Q. PFAHLER.
AUTOMOBILE LAMP ATTACHMENT.
APPLICATION FILED MAR. 29, 1913.
1,076,699.
Patented Oct. 28, 1913.
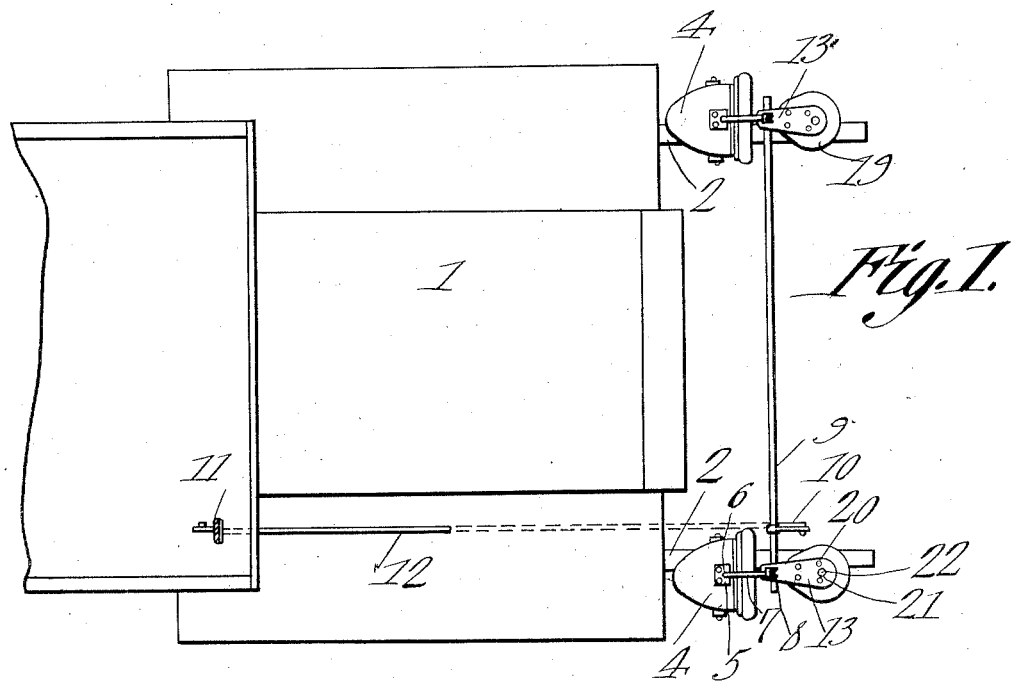
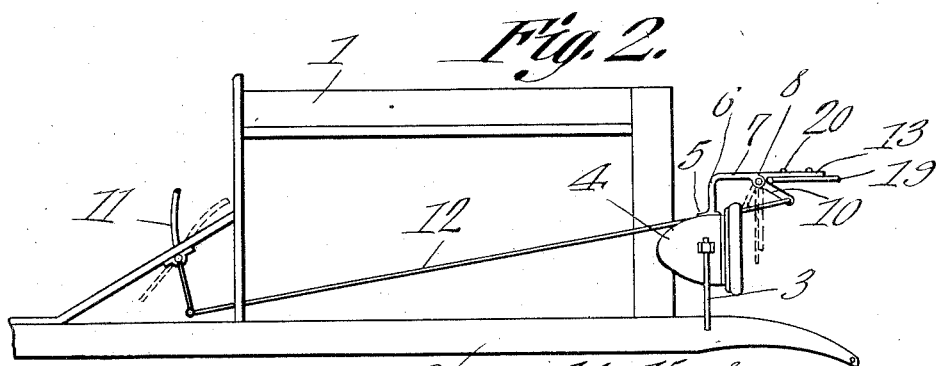
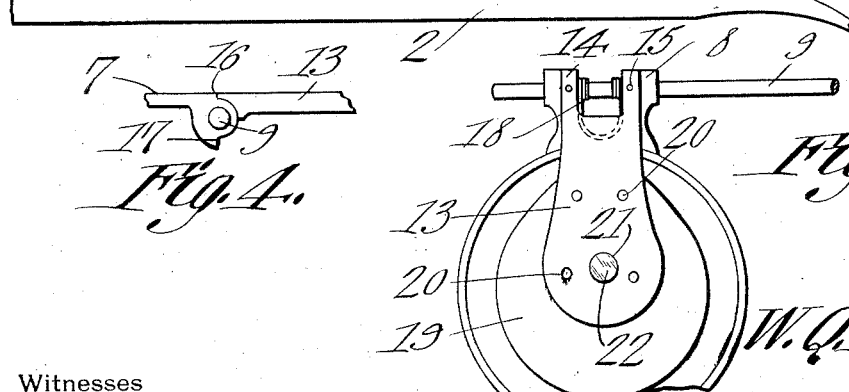
Witnesses
Inventor
W. Q. Pfahler
by
Attorneys

UNITED STATES PATENT OFFICE.

WILLIAM Q. PFAHLER, OF TOLEDO, OHIO.

AUTOMOBILE LAMP ATTACHMENT.

1,076,699. Specification of Letters Patent. Patented Oct. 28, 1913.

Application filed March 29, 1913. Serial No. 757,681.

*To all whom it may concern:*

Be it known that I, WILLIAM Q. PFAHLER, a citizen of the United States, residing at Toledo, in the county of Lucas and State of Ohio, have invented a new and useful Automobile Lamp Attachment, of which the following is a specification.

This invention relates to attachments for automobile lamps whereby the central portion thereof may be covered.

An object of the present invention is to provide a shutter for an automobile lamp which is adapted to rotate there in front, or thereabove and which shutter is adapted to prevent the light from issuing from the central portion of the lamp but allows the light to issue from the side edges thereof.

A further object is to provide a bracket secured to the upper portion of a lamp and which bracket projects upwardly and forwardly over the front thereof, and to which bracket is hingedly mounted a shutter of smaller diameter than the diameter of the lamp lens and which shutter is adapted to rotate there in front, resilient means being provided whereby the said shutter will be normally held in a horizontal position.

A further object is to provide a hingedly mounted shutter adapted to rotate in front of a lamp and with means secured thereto whereby the said shutter may assume a horizontal position or may rotate 90 degrees therefrom to a substantially vertical position in which latter position, it will be positioned directly in front and spaced from the said lamp.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a plan view illustrating my improved shutter attachment secured to a pair of automobile lamps and the actuating mechanism therefor. Fig. 2 is a side view in elevation thereof. Fig. 3 is a detail of one of the shutters illustrating the manner in which it is secured to the bracket. Fig. 4 is a detail of a portion of the bracket and the shutter supporting arm.

Referring to the drawings in which similar reference numerals designate corresponding parts throughout the several views, 1 generally designates the forward portion of an automobile and 2 the angle iron frame thereof. Secured to the frame 2 are the lamp supporting upright members 3 to the upper portion of which are secured the lamps 4, said lamps being of the usual type mounted upon the forward portion of automobiles and are usually termed search-lights. Secured to the top portion of the lamp 4 is a bracket comprising a base plate 5 and extending upwardly therefrom is an arm 6 bent horizontally as at 7 and provided with the bifurcated end 8 illustrated in detail in Fig. 3. As illustrated in Fig. 1 of the drawings each of the lamps is provided with a bracket as just described and the said bifurcated ends thereof are provided with an aperture extending therethrough into which apertures are journaled the rotatable rod 9 to which rod is secured the actuating arm 10 which is secured to an operating lever 11 positioned upon the dashboard by means of the link 12, the said lever 11 being of the type of a foot treadle and is adapted to be engaged by the foot of a person seated within the automobile and by a moving of the said treadle the rod 9 will be rotated through approximately 90 degrees.

A shutter supporting arm 13 is provided with a bifurcated end 14, which bifurcated end portion is provided with an aperture extending therethrough and through which extends the rod or shaft 9. The shutter supporting arm 13 is rigidly secured to the shaft 9 by the rivet 15 or similar means whereby a rotation of the shaft 9 will rotate the said arm 13.

As illustrated in Fig. 4 of the drawings, the enlarged bifurcated end 8 of the bracket is provided with a shoulder 16 against which a corresponding shoulder formed on the arm 13 contacts and which limits the rotation of the said shutter supporting arm 13 in one direction, the rotation of the said arm 13 being limited in the other direction by reason of the shoulder 17, from which it will be apparent that the shutter supporting arm 13 is limited to a rotation of substantially 90 degrees, that is from a horizontal position as illustrated in Fig. 2 to the substantially vertical position as illustrated in Fig. 3. In order that the arm 13 will normally tend to maintain a substantially horizontal position the resilient member 18 is rigidly secured to the shaft or rod 9 and contacts with the horizontal arm 7 of the bracket, the result being that a certain torsional force will be exerted upon the rod 9 to maintain the shutter supporting arm in a horizontal position. A similar construction is provided for upon the other lamp and by reason of which the two arms 13 will be simultaneously rotated by an actuation of the foot treadle 11. Rigidly secured to the arm 13 is what is termed a shutter 19, the same being of relatively smaller diameter than the diameter of the front portion of the lamp, the same being clearly shown in Fig. 3 of the drawings. The said shutter 19 is secured to the arm 13 by the rivet 20 or some equivalent means. The shutter 19 and arm 13 are provided with alined apertures 21 extending therethrough into which is positioned a red glass 22, it being noted that the arm 13 and the shutter 19 are formed of some opaque material.

From the foregoing it will be apparent that my improved attachment for automobile lamps may be quickly and easily attached to lamps already in use without requiring any structural changes thereof. By reason of the spring members 18 the shutters 19 will normally remain in a substantially horizontal position and the light will be allowed to issue from the lamp without interference. When, however, an automobile is coming from the opposite direction, in order to prevent the rays or the searchlight from dazzling and shining directly in the face of the operator, the foot treadle 11 is pressed forwardly into the position as shown in dotted lines in Fig. 2, which by reason of the linked connection 12 will rotate the rod 9 through substantially 90 degrees and the two shutters 19 will be simultaneously rotated into a substantially vertical position in front of the searchlight and will effectually cut off the forwardly projecting rays so that the same will not dazzle or blind the operator of the other car. By reason of the fact that the shutters when rotated to a substantially vertical position are spaced a distance in front of the lenses of the lamps the rays which issue at an angle therefrom will be allowed to pass the said shutter and will illuminate the sides of the road. Also by reason of the fact that the shutters are of relatively less diameter than the lamp lenses the light will be allowed to issue therefrom which will illuminate the sides of the road. By reason of the red glass 22 positioned in the shutter and arm 13, the oncoming car will be given suitable warning of the presence of another car. The entire construction is simple and particularly adapted for the purpose at hand.

Having thus fully described the invention what I claim to be new and original with me is:—

1. The combination with a lamp, of a shutter rotatably mounted in front of said lamp, said shutter of relatively smaller diameter than the lamp diameter, means for normally holding said shutter in a horizontal position above said lamp, means for rotating said shutter in front of said lamp and spaced a distance therefrom to allow the angularly disposed rays to be propagated therebeyond.

2. The combination with a lamp, of a bracket rigidly secured thereto, the free end of said bracket bifurcated and provided with an aperture extending therethrough, an arm pivotally secured to said bracket, a shutter of relatively smaller diameter than the lamp diameter rigidly secured to said arm, resilient means engaging said arm and secured to said bracket adapted to normally hold said shutter in a horizontal position above said lamp, and means for rotating said shutter in front of said lamp and spaced a distance therefrom.

3. The combination with a lamp, of a bracket secured to the top thereof and projecting in front of the same, said bracket provided with a bifurcated end having an aperture extending therethrough, a shaft journaled in said aperture, an arm rigidly secured to said shaft and adapted to rotate therewith, a shutter rigidly secured to said arm, a torsional spring disposed between said bracket bifurcations engaging said bracket and shaft to hold said shutter in a horizontal position, an actuating arm rigidly secured to said shaft, a link pivotally secured to said actuating arm, and means secured to said link for rotating the said shutter from a horizontal position to a vertical one in front of said lamp.

4. The combination with an automobile lamp, of an angle bracket rigidly secured to the upper portion thereof and extending beyond the front of the same, the free end of said bracket provided with an enlarged bifurcated portion with an aperture extending therethrough, a shaft journaled within said aperture, an arm rigidly secured to said shaft and adapted to be rotated thereby, a shutter of less diameter than the lamp diameter rigidly secured to said arm, torsional means engaging said shaft and said bracket adapted to normally hold said shutter in a horizontal elevated position out of the line of propagation of the light, an actuating arm secured to said shaft, a lever linkedly connected to said actuating arm adapted to rotate said shaft through approximately 90 degrees to thereby rotate said shutter to a vertical depending position in front of said lamp and spaced a distance there in front.

5. The combination with a pair of spaced automobile lamps, of angle brackets secured thereto projecting thereabove and in front of the same, the outer extremities of said brackets provided with bifurcated ends with apertures extending therethrough, bifurcated shutter carrying arms provided with apertures extending therethrough, a shaft journaled within said bracket apertures and rotatably supporting said arms, torsional springs disposed between said bracket and arm bifurcations to hold said shutter carrying arms in a substantially horizontal position, opaque shutters of relatively less diameter than the lamp diameters rigidly secured to said shutter carrying arms, means for limiting the rotation of said shutter carrying arms to a horizontal and vertical position, an actuating arm rigidly secured to said shaft, a lever linkedly secured to said actuating arm adapted to rotate said shaft to simultaneously rotate the shutters in front of and spaced a distance from said lamps.

In testimony that I claim the foregoing as my own, I have hereto affixed my signature in the presence of two witnesses.

WILLIAM Q. PFAHLER.

Witnesses:
JAY M. COGAN,
W. R. ALSPACH.